(12) United States Patent
Muskos et al.

(10) Patent No.: US 12,734,984 B2
(45) Date of Patent: Sep. 15, 2026

(54) BUMPER BEAM

(71) Applicant: AUTOTECH ENGINEERING S.L., Amorebieta-Etxano (ES)

(72) Inventors: Per Muskos, Luleå (SE); Tony Häggström, Rosvik (SE); Mikael Johansson, Piteå (SE)

(73) Assignee: AUTOTECH ENGINEERING S.L., Amorebieta-Etxano (ES)

(*) Notice: Subject to any disclaimer, the term of this patent is extended or adjusted under 35 U.S.C. 154(b) by 381 days.

(21) Appl. No.: 18/289,847

(22) PCT Filed: Mar. 16, 2022

(86) PCT No.: PCT/EP2022/056806

§ 371 (c)(1),
(2) Date: Nov. 7, 2023

(87) PCT Pub. No.: WO2022/248095

PCT Pub. Date: Dec. 1, 2022

(65) Prior Publication Data

US 2024/0239284 A1 Jul. 18, 2024

(30) Foreign Application Priority Data

May 26, 2021 (EP) .................................... 21175867

(51) Int. Cl.
*B60R 19/18* (2006.01)

(52) U.S. Cl.
CPC ...... *B60R 19/18* (2013.01); *B60R 2019/1813* (2013.01)

(58) Field of Classification Search
CPC ............ B60R 19/18; B60R 2019/1813; B60R 2019/182; B60R 2019/1826; B21D 53/88
(Continued)

(56) References Cited

U.S. PATENT DOCUMENTS 6,217,089 B1 4/2001 Goto et al.
6,343,820 B1 * 2/2002 Pedersen ................ B60R 19/18 293/122
(Continued)

FOREIGN PATENT DOCUMENTS

DE 20-2012-002264 U1 6/2012
JP H1177150 A 3/1999
(Continued)

OTHER PUBLICATIONS

International Search Report issued in PCT/EP2022/056806; mailed Jul. 22, 2022.
(Continued)

*Primary Examiner* — Gregory A Blankenship
(74) *Attorney, Agent, or Firm* — Burr & Forman

(57) ABSTRACT

A bumper beam of a sheet metal formed to a closed hollow structure comprising a first side wall and a second side wall. The sheet metal comprises a first longitudinal side and a second longitudinal side. The sheet metal is formed such that the first longitudinal side is formed to a horizontal member located inside the closed hollow structure and such that the second side wall forms a recess into which the first longitudinal side extends. The first longitudinal side and the recess are configured to form a locking of the horizontal member when the bumper beam is deformed due to an impact. In the recess the first longitudinal side is unwelded to the second side wall while the second longitudinal side is welded to the closed hollow structure.

17 Claims, 2 Drawing Sheets

(58) Field of Classification Search
USPC .......................................................... 293/102
See application file for complete search history.

(56) References Cited

U.S. PATENT DOCUMENTS

| | | | | |
|---|---|---|---|---|
| 7,055,886 | B2 * | 6/2006 | Guiles | B21D 47/01 228/17 |
| 11,427,144 | B2 * | 8/2022 | Baas | B21D 5/086 |
| 12,391,200 | B2 * | 8/2025 | Matecki | B23K 9/025 |
| 2016/0280163 | A1 * | 9/2016 | Matecki | B60R 19/023 |
| 2020/0262372 | A1 * | 8/2020 | Herisson | B21D 53/88 |
| 2024/0239284 | A1 * | 7/2024 | Muskos | B60R 19/18 |
| 2024/0399990 | A1 * | 12/2024 | McHenry | B60R 19/18 |

FOREIGN PATENT DOCUMENTS

| | | | |
|---|---|---|---|
| JP | 2000-343163 | A | 12/2000 |
| WO | 2015/160298 | A1 | 10/2015 |

OTHER PUBLICATIONS

Notice of Reasons for Refusal from corresponding Japanese Application No. 2023-561669, mailed Dec. 23, 2025, all pages cited in its entirety.

* cited by examiner 22
26

26
20

10

BUMPER BEAM

TECHNICAL FIELD

The present invention relates to a bumper beam, for example to be used as a bumper beam for vehicles.

BACKGROUND

Roll-forming is a conventional method for forming elements to obtain a specific shape as seen in cross-section. Many of these roll-formed elements are beams and elongated structures that are used in a variety of structures, for instance as crash barriers along roads and as bumpers in vehicles. In general, a bumper beam for vehicles may be rolled to a closed form as seen in cross-section. Since there are regulations in many countries regarding what type of impact and how high impact these beams are supposed to handle, different conventional solutions have been developed to handle the crash forces.

SUMMARY

The inventors of the present invention have found drawbacks in conventional bumper beams. For example, some conventional bumper beams are not sufficiently strong or resistant while still having a sufficiently low weight.

An object of embodiments of the invention is to provide a solution which mitigates or solves drawbacks and problems of conventional solutions.

The above and further objects are solved by the subject matter of the independent claim. Further advantageous embodiments of the invention can be found in the dependent claims.

According to a first aspect of the invention, the above mentioned and other objects are achieved with a bumper beam of a sheet metal formed to a closed hollow structure comprising a first side wall and a second side wall,

- wherein the sheet metal comprises a first longitudinal side and a second longitudinal side,
- wherein the sheet metal is formed such that the first longitudinal side is formed to a horizontal member located inside the closed hollow structure and such that the second side wall forms a recess into which the first longitudinal side extends,
- wherein the first longitudinal side and the recess are configured to form a locking of the horizontal member when the bumper beam is deformed due to an impact,
- wherein in the recess the first longitudinal side is unwelded to the second side wall, and
- wherein the second longitudinal side is welded to the closed hollow structure.

An advantage of the bumper beam according to the first aspect is that an improved bumper beam is provided. An advantage of the bumper beam according to the first aspect is that an improved impact protection for a vehicle having the innovative bumper beam is provided. An advantage of the bumper beam according to the first aspect is that an advantageous deformation of the bumper beam for absorbing impacts or impact energy is provided while maintaining or improving the rigidity and reinforcement of the bumper beam in order to prevent or counteract penetration by external objects upon a collision. An advantage of the bumper beam according to the first aspect is that an efficient energy absorption of energy of an impact, for example upon a collision, is provided. An advantage of the bumper beam according to the first aspect is that the performance of the bumper beam in collisions is improved, for example because the bumper beam can be deformed in a more controlled and more predicted manner in relation to conventional solutions.

An advantage of the bumper beam according to the first aspect is that the weight and thus the cost of the bumper beam can be reduced while still maintaining or even improving the rigidity and reinforcement of the bumper beam. An advantage of the bumper beam according to the first aspect is that the horizontal member will have a reinforcing effect on the bumper beam during deformation without the need of excessive welding and/or without the need for the first longitudinal side to be welded. Less weld results in a reduced weight of the bumper beam. Less welding facilitates the production of the bumper beam. Upon an impact, the recess locks the horizontal member and prevents the horizontal member from sliding along an inner surface of the hollow structure during the impact.

According to an advantageous embodiment of the bumper beam according to the first aspect, the closed hollow structure together with the first and second side walls define an inner space, wherein in the inner space the first longitudinal side is unwelded to the second side wall. An advantage of this embodiment is that the impact protection and/or the bumper beam is/are further improved.

According to a further advantageous embodiment of the bumper beam according to the first aspect, a wall portion of the second side wall defines the recess, wherein in one or more of the recess and inner space the first longitudinal side is unwelded to the wall portion. An advantage of this embodiment is that the impact protection and/or the bumper beam is/are further improved.

According to another advantageous embodiment of the bumper beam according to the first aspect, in the recess the first longitudinal side is unattached to one or more of the second side wall and wall portion. An advantage of this embodiment is that the impact protection and/or the bumper beam is/are further improved.

According to yet another advantageous embodiment of the bumper beam according to the first aspect, in the inner space the first longitudinal side is unattached to one or more of the second side wall and wall portion. An advantage of this embodiment is that the impact protection and/or the bumper beam is/are further improved.

According to still another advantageous embodiment of the bumper beam according to the first aspect, the sheet metal is bent to form the horizontal member, wherein the second longitudinal side ends just below the region of the bent forming the horizontal member. An advantage of this embodiment is that the impact protection and/or the bumper beam is/are further improved.

According to an advantageous embodiment of the bumper beam according to the first aspect, when the bumper beam is attached to a main body of a vehicle, one or more of the horizontal member and first longitudinal side is/are configured to point at least in a direction toward the main body of the vehicle. An advantage of this embodiment is that the impact protection and/or the bumper beam is/are further improved. The main body of the vehicle may comprise a main frame or a chassis. However, for alternative embodiments, one or more of the horizontal member and first longitudinal side may be configured to point in a direction away from the main body of the vehicle.

According to a further advantageous embodiment of the bumper beam according to the first aspect, when the bumper beam is attached to a main body of a vehicle, the recess is configured to open in a direction away from the main body of the vehicle. An advantage of this embodiment is that the impact protection and/or the bumper beam is/are further improved. However, for alternative embodiments, the recess may be configured to open in a direction toward the main body of the vehicle.

According to another advantageous embodiment of the bumper beam according to the first aspect, when the bumper beam is attached to a main body of a vehicle, one or more of the horizontal member and first longitudinal side is/are configured to extend into the recess at least in a direction toward the main body of the vehicle. An advantage of this embodiment is that the impact protection and/or the bumper beam is/are further improved.

According to yet another advantageous embodiment of the bumper beam according to the first aspect, the closed hollow structure has an outer side and an inner side, wherein the outer side faces away from the horizontal member, and wherein the second longitudinal side is welded to the outer side of the closed hollow structure. An advantage of this embodiment is that the impact protection and/or the bumper beam is/are further improved.

According to still another advantageous embodiment of the bumper beam according to the first aspect, the first longitudinal side has a longitudinal edge, wherein in the recess there is a gap or distance between the longitudinal edge of the first longitudinal side and the second side wall at least before any deformed due to an impact. An advantage of this embodiment is that the impact protection and/or the bumper beam is/are further improved. An advantage of this embodiment is that before any impact, any contact between the first longitudinal side and the surface defining the recess is avoided, which otherwise could lead to noise due to vibrating contact between the horizontal member and the surface of the recess, when the bumper beam is attached to a vehicle. An advantage of this embodiment is that before any impact, corrosion issues may be avoided since water entering the bumper beam will not be gathered on the horizontal member due to the gap. However, for alternative embodiments, in the recess there may be a physical contact between the longitudinal edge of the first longitudinal side and the second side wall before any deformed due to an impact.

According to an advantageous embodiment of the bumper beam according to the first aspect, the first longitudinal side has a longitudinal edge, wherein the horizontal member extends into, but with a gap or distance between the longitudinal edge of the first longitudinal side and the recess when the bumper beam is manufactured. An advantage of this embodiment is that the impact protection and/or the bumper beam 10 is/are further improved. An advantage of this embodiment is that before any impact, any contact between the first longitudinal side and the surface defining the recess is avoided, which otherwise could lead to noise due to vibrating contact between the horizontal member and the surface of the recess, when the bumper beam is attached to a vehicle. An advantage of this embodiment is that before any impact, corrosion issues may be avoided since water entering the bumper beam will not be gathered on the horizontal member due to the gap.

According to a further advantageous embodiment of the bumper beam according to the first aspect, the gap or distance is between a few millimetres and the depth of the recess. An advantage of this embodiment is that the impact protection and/or the bumper beam is/are further improved.

According to another advantageous embodiment of the bumper beam according to the first aspect, the second longitudinal side ends in a region of the horizontal member. An advantage of this embodiment is that the impact protection and/or the bumper beam is/are further improved.

According to yet another advantageous embodiment of the bumper beam according to the first aspect, the closed hollow structure is obtained by roll forming. An advantage of this embodiment is that the impact protection and/or the bumper beam is/are further improved.

According to still another advantageous embodiment of the bumper beam according to the first aspect, the recess opens toward the horizontal member. An advantage of this embodiment is that the impact protection and/or the bumper beam is/are further improved.

According to an advantageous embodiment of the bumper beam according to the first aspect, wherein the recess opens to the inner space. An advantage of this embodiment is that the impact protection and/or the bumper beam is/are further improved.

According to another aspect of the invention, a bumper beam is provided, made of a sheet-metal plate formed to a closed hollow structure with a first and a second side wall, comprising a first side and a second side, wherein the beam is formed such that the first side is formed with a generally horizontal element inside the hollow structure, that the second side wall is arranged with a recess into which the first side extends, forming a locking action of the horizontal element when the bumper beam is deformed due to an impact.

The above-mentioned features and embodiments of the bumper beam may be combined in various possible ways providing further advantageous embodiments.

Further advantageous embodiments of the bumper beam according to the present invention and further advantages with the embodiments of the present invention emerge from the detailed description of embodiments.

BRIEF DESCRIPTION OF THE DRAWINGS

Embodiments of the invention will now be illustrated, for exemplary purposes, in more detail by way of embodiments and with reference to the enclosed drawings, where similar references are used for similar parts, in which.

DETAILED DESCRIPTION

Figure 2:
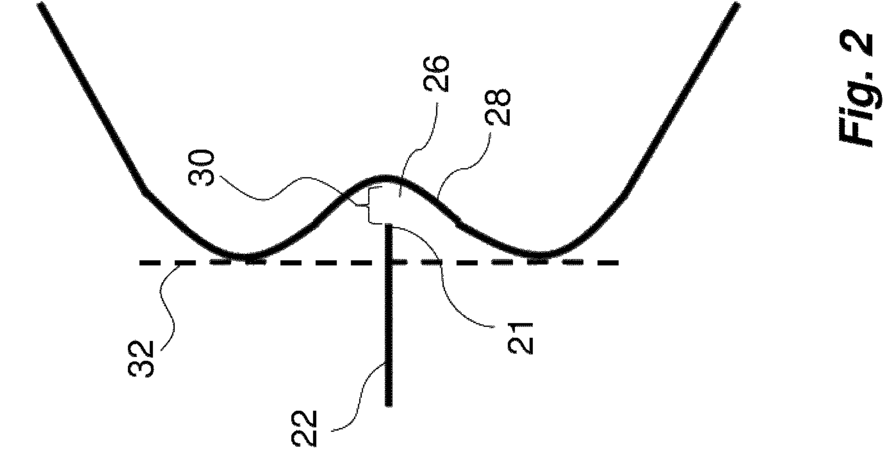
FIG. 2 is a schematic enlargement of a portion of the bumper beam of FIG. 1.
Figure 1:
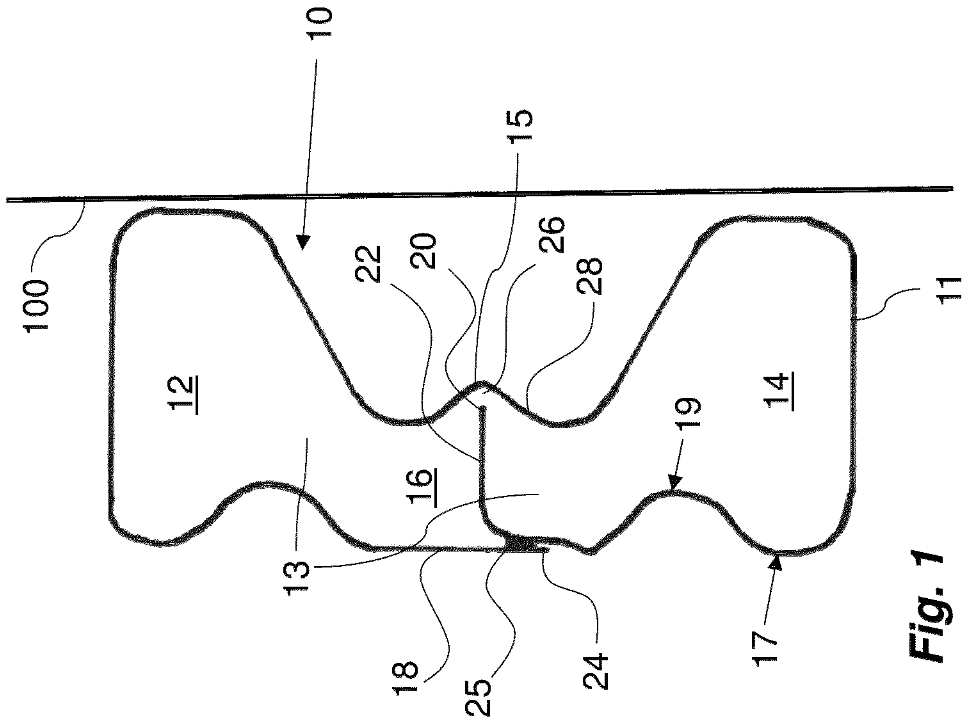
FIG. 1 is a schematic cross-section view of an embodiment of the bumper beam according to the first aspect of the invention.

With reference to FIGS. 1 and 2, aspects of an embodiment of the bumper beam 10 according to the first aspect of the invention are schematically illustrated. The bumper beam 10 may be described to be elongated. The bumper beam 10 may be described to have a longitudinal extension, for example, extending in a longitudinal direction. The bumper beam 10 may be configured for the attachment to a vehicle, for example, for the attachment to a main body 100 of a vehicle. The main body 100 may comprise a main frame or a chassis.

With reference to FIGS. 1 and 2, the bumper beam 10 is made of a sheet metal, or a sheet metal plate. The sheet metal is formed to a closed hollow structure 11. The closed hollow structure 11 includes a first side wall 18 and a second side wall 28. The sheet metal includes, or forms, a first longitudinal side 20 and a second longitudinal side 24. The first longitudinal side 20 may be described to be opposite the second longitudinal side 24, for example before the sheet metal is formed to the closed hollow structure 11. The sheet metal is formed such that the first longitudinal side 20 is formed to a horizontal member 22 located inside the closed hollow structure 11 and such that the second side wall 28 forms a recess 26 into which the first longitudinal side 20 extends. When the bumper beam 10 is attached to the main body 100 of a vehicle, "horizontal" with regard to the horizontal member 22 is to be understood as substantially horizontal. The extension of the horizontal member 22 may deviate from a strictly horizontal orientation, for example when the vehicle is resting on a slope. For some embodiments, the horizontal member 22 may be referred to as a horizontal element or web.

With reference to FIGS. 1 and 2, the first longitudinal side 20 and the recess 26 are configured to form a locking of the horizontal member 22, or a locking action, when the bumper beam 10 is deformed due to an impact. In the recess 26, the first longitudinal side 20 is unwelded, i.e. not welded, to the second side wall 28 while the second longitudinal side 24 is welded to the closed hollow structure 11. It may be defined, or described, that the first longitudinal side 20 and the recess 26 are configured cooperate, or interact, to form the locking of the horizontal member 22 when the bumper beam 10 is deformed due to an impact.

With reference to FIGS. 1 and 2, the bumper beam 10 may be used as a front bumper beam, i.e. positioned at the front of the main body 100 of the vehicle, or may be used as a rear bumper beam, i.e. positioned at the rear end of the main body 100 of the vehicle. The sheet metal and/or the closed hollow structure 11 may be made of a material comprising or consisting of a metal or a metal alloy. However, other materials are possible. The closed hollow structure 11 may be described to have a longitudinal extension, for example, extending in a longitudinal direction. When attached to the main body 100 of a vehicle, the longitudinal extension of the bumper beam 10 or of the closed hollow structure 11 may extend in a longitudinal direction which is transverse to the longitudinal extension of the main body 100 of the vehicle.

With reference to FIGS. 1 and 2, for some embodiments, the closed hollow structure 11 together with the first and second side walls 18, 28 may define an inner space 13. In the inner space 13, the first longitudinal side 20 may be unwelded to the second side wall 28. For some embodiments, the second side wall 28 may comprise a wall portion 15. The wall portion 15 of the second side wall 28 may define, or form, the recess 26. In the recess 26 and/or in the inner space 13, the first longitudinal side 20 may be unwelded to the wall portion 15.

With reference to FIGS. 1 and 2, for some embodiments, in the recess 26, the first longitudinal side 20 is unattached to the second side wall 28 and/or the wall portion 13. For some embodiments, in the inner space 13, the first longitudinal side 20 is unattached to the second side wall 28 and/or the wall portion 13. For some embodiments, the sheet metal is bent to form the horizontal member 22, and the second longitudinal side 24 ends just below the region of the bent forming the horizontal member 22.

With reference to FIGS. 1 and 2, for some embodiments, when the bumper beam 10 is attached to a main body 100 of a vehicle, the horizontal member 22 and/or the first longitudinal side 20 may be configured to point at least in a direction toward the main body 100 of the vehicle. For some embodiments, when the bumper beam 10 is attached to a main body 100 of a vehicle, the recess 26 may be configured to open in a direction away from the main body 100 of the vehicle. For some embodiments, when the bumper beam 10 is attached to a main body 100 of a vehicle, the horizontal member 22 and/or the first longitudinal side 20 may be configured to extend into the recess 26 at least in a direction toward the main body 100 of the vehicle.

With reference to FIGS. 1 and 2, for some embodiments, the closed hollow structure 11 may be described to have an outer side 17 and an inner side 19. The outer side 17 faces away from the horizontal member 22. The second longitudinal side 24 may be welded to the outer side 17 of the closed hollow structure 11.

With reference to FIG. 2, for some embodiments, the first longitudinal side 20 may be described to have a longitudinal edge 21. In the recess 26, there may be a gap 30 or distance 30 between the longitudinal edge 21 of the first longitudinal side 20 and the second side wall 28 at least before any deformed due to an impact. For some embodiments, the horizontal member 22 may extend into, but with a gap 30 or distance 30 between the longitudinal edge 21 of the first longitudinal side 20 and the recess 26 when the bumper beam 10 is manufactured. For some embodiments, the gap 30 or distance 30 may be between a few millimetres and the depth of the recess 26.

With reference to FIGS. 1 and 2, for some embodiments, the second longitudinal side 24 may end in a region of the horizontal member 22. The closed hollow structure 11 may be obtained by roll forming. For some embodiments, the recess 26 may be described to open toward the horizontal member 22 and/or open to the inner space 13.

With reference to FIGS. 1 and 2, for some embodiments, the bumper beam 10 has a certain closed profile with an upper and a lower generally rectangular section 12, 14 that are interconnected by a central section 16. One side wall 18 of the central section may be generally planar and vertical, for example when attached to a main body 100 of a vehicle. The bumper beam 10 may be roll-formed to the profile shown in the figures such that a first side 20 of the roll-formed steel sheet is bent to form a generally planar and horizontal inner element 22, or member 22, or web 22. The second side 24 of the steel sheet may end just below the bending area of the first side 20 and may be welded thereto with a weld 25. In this regard, a number of different welding solutions may be employed, such as resistance welding, spot or continuous, arc welding, laser welding, just to mention a few. However, the first side 20 is not welded but extends into a profiled recess 26 in a second side wall 28 of the central section as illustrated in FIG. 1. In order to avoid vibrations and noise due to contact between the first side 20 and the recess 26, there may be a small gap or distance 30 between them.

With reference to FIGS. 2, for some embodiments, the distance 30 may be some millimetres, but it may be taken into account that the edge of the first side 20 may be somewhat wavy due to the manufacturing process, such as roll-forming, which could occur in particular if the bumper beam 10 is bent to follow the shape of a vehicle front or back. However, the distance could be larger, up to the start of the recess 26 on the inner surface of the second side wall 28, for example as indicated by line 32 in FIG. 2, thus depending on the depth of the recess 26. This may also be advantageous with regard to prevention of corrosion inside the bumper beam 10. The design of the bumper beam 10 may be obtained by roll forming technology with only one weld, wherein the roll forming may follow conventional and known methods known to the skilled person.

For some embodiments, if the bumper beam 10 is exposed to an impact, the first side 20 will be moved into contact with the recess 26, or into contact with the second side wall 28 and/or the wall portion 15 of the second side wall 28, thereby acting as a reinforcement of the bumper beam 10. This is schematically illustrated in FIGS. 3 to 6. The first side 20 and/or the horizontal member 22 will also, together with the rest of the profiled bumper beam, act as an energy absorber, or as an impact energy absorber.

Figures 3, 4, 5, 6:
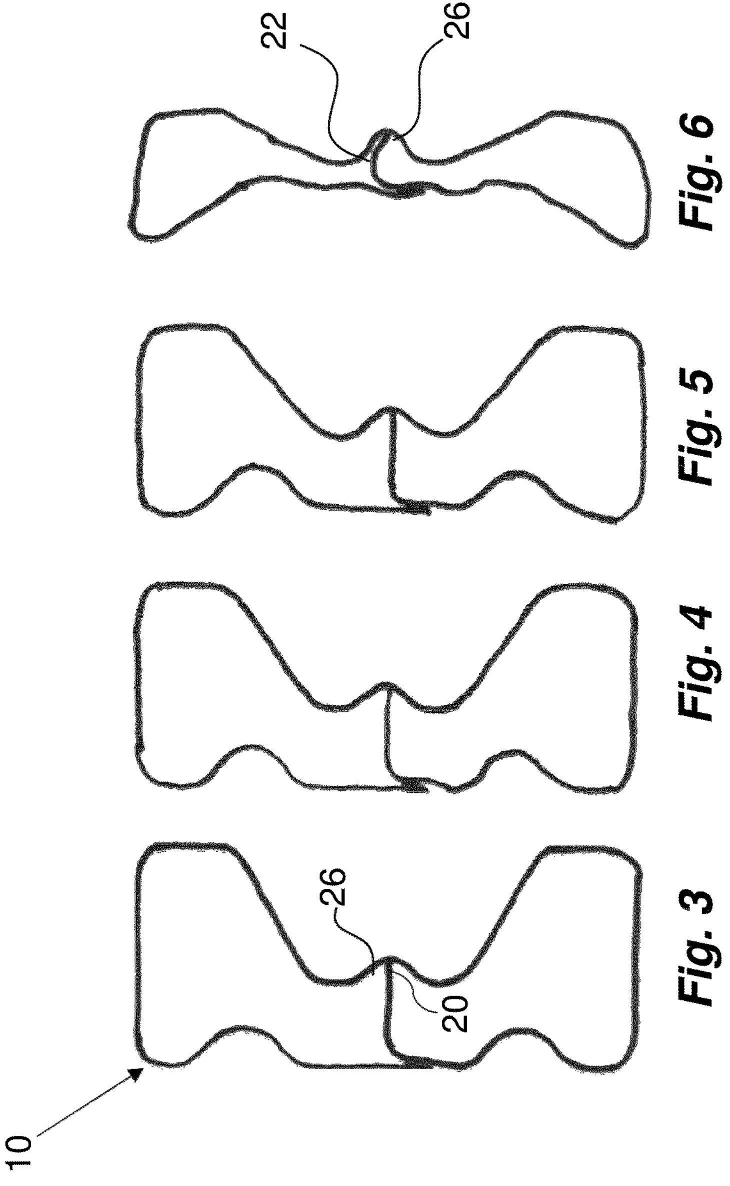
FIGS. 3-6 schematically illustrate deformation of the bumper beam of FIG. 1 during an impact.

With reference to FIGS. 3 to 6, as seen in a simulated point impact, the profiled bumper beam will be compressed and the inner element 22, or member 22, may be bent as seen in FIG. 5 or FIG. 6. An advantageous feature is that the gap 30 or distance 30 is chosen such that it is assured that the first side 20 enters into the recess 26 and is "locked" by the recess 26 of the second side wall 28, so that the first side 20 is prevented from sliding upwards or downwards along the second side wall 28 of the central section 16. This assures a reinforcement of the bumper beam 10. This design also excludes the need for welding the first side 20 to the second side wall 28, as is done conventionally. Thus, the production of the bumper beam 10 is simplified, or facilitated, and thus made faster, and the production cost is reduced. With reference to FIGS. 3 to 6, the impact, or impact energy, affecting the bumper beam 10 is coming from the left and toward the bumper beam 10, for example when the moving vehicle hits an external object to the left of the bumper beam 10 in FIGS. 3 to 6.

Even though the bumper beam 10 illustrated in the drawings has a specific profile, it is to be understood that the bumper beam 10 may have a number of other profiles while using the reinforcement described above.

The present invention is not limited to the above-described embodiments. Instead, the present invention relates to, and encompasses all different embodiments being included within the scope of the appended independent claim.

The invention claimed is:

1. A bumper beam of a sheet metal formed to a closed hollow structure comprising a first side wall and a second side wall, wherein the sheet metal comprises a first longitudinal side and a second longitudinal side, wherein the sheet metal is formed such that the first longitudinal side is formed to a horizontal member located inside the closed hollow structure and such that the second side wall forms a recess into which the first longitudinal side extends, wherein the first longitudinal side and the recess are configured to form a locking of the horizontal member when the bumper beam is deformed due to an impact, wherein the first longitudinal side is unwelded to the second side wall in the recess, and wherein the second longitudinal side is welded to the closed hollow structure.

2. The bumper beam according to claim 1, wherein the closed hollow structure together with the first and second side walls define an inner space, and wherein the first longitudinal side is unwelded to the second side wall in the inner space.

3. The bumper beam according to claim 1, wherein a wall portion of the second side wall defines the recess, and wherein the first longitudinal side is unwelded to the wall portion in one or more of the recess and inner space.

4. The bumper beam according to claim 1, wherein the first longitudinal side is unattached to one or more of the second side wall and wall portion in the recess.

5. The bumper beam according to claim 2, the first longitudinal side is unattached to one or more of the second side wall and wall portion in the inner space.

6. The bumper beam according to claim 1, wherein the sheet metal is bent to form the horizontal member, and wherein the second longitudinal side ends just below a region of the bent forming the horizontal member.

7. The bumper beam according to claim 1, wherein when the bumper beam is attached to a main body of a vehicle, one or more of the horizontal member and first longitudinal side is/are configured to point at least in a direction toward the main body of the vehicle.

8. The bumper beam according to claim 1, wherein when the bumper beam is attached to a main body of a vehicle, the recess is configured to open in a direction away from the main body of the vehicle.

9. The bumper beam according to claim 1, wherein when the bumper beam is attached to a main body of a vehicle, one or more of the horizontal member and first longitudinal side is/are configured to extend into the recess at least in a direction toward the main body of the vehicle.

10. The bumper beam according to claim 1, wherein the closed hollow structure has an outer side and an inner side, wherein the outer side faces away from the horizontal member, and wherein the second longitudinal side is welded to the outer side of the closed hollow structure.

11. The bumper beam according to claim 1, wherein the first longitudinal side has a longitudinal edge, and wherein in the recess there is a gap or distance between the longitudinal edge of the first longitudinal side and the second side wall at least before any deformed due to an impact.

12. The bumper beam according to claim 1, wherein the first longitudinal side has a longitudinal edge, wherein the horizontal member extends into, but with a gap or distance between the longitudinal edge of the first longitudinal side and the recess when the bumper beam is manufactured.

13. The bumper beam according to claim 11, wherein the gap or distance is between 1.5 millimetres and the depth of the recess.

14. The bumper beam according to claim 1, wherein the second longitudinal side ends in a region of the horizontal member.

15. The bumper beam according to claim 1, wherein the closed hollow structure is obtained by roll forming.

16. The bumper beam according to claim 1, wherein the recess opens toward the horizontal member.

17. The bumper beam according to claim 2, wherein the recess opens to the inner space.

* * * * *